US012738070B2

(12) United States Patent
Zhang et al.

(10) Patent No.: US 12,738,070 B2
(45) Date of Patent: Sep. 15, 2026

(54) METHOD FOR DETECTING OBSTACLE, ELECTRONIC DEVICE, AND STORAGE MEDIUM

(71) Applicant: Beijing Baidu Netcom Science Technology Co., Ltd., Beijing (CN)

(72) Inventors: Xiao Zhang, Beijing (CN); Fangfang Dong, Beijing (CN); Guowei Wan, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 1066 days.

(21) Appl. No.: 17/889,091

(22) Filed: Aug. 16, 2022

(65) Prior Publication Data

US 2023/0056784 A1 Feb. 23, 2023

(30) Foreign Application Priority Data

Aug. 17, 2021 (CN) ......................... 202110945486.6

(51) Int. Cl.
*G06V 20/58* (2022.01)
*B60W 60/00* (2020.01)
*G01S 7/497* (2006.01)

(52) U.S. Cl.
CPC ........... *G06V 20/58* (2022.01); *B60W 60/001* (2020.02); *G01S 7/4972* (2013.01); *B60W 2420/408* (2024.01)

(58) Field of Classification Search
None
See application file for complete search history.

(56) References Cited

U.S. PATENT DOCUMENTS

2019/0236381 A1 8/2019 Rochan Meganathan et al.
2021/0026355 A1 1/2021 Chen et al.
(Continued)

FOREIGN PATENT DOCUMENTS

CN 109145677 A 1/2019
CN 109145680 A 1/2019
(Continued)

OTHER PUBLICATIONS

Asvadi, A., Premebida, C., Peixoto, P., & Nunes, U. (2016). 3D Lidar-based static and moving obstacle detection in driving environments: An approach based on voxels and multi-region ground planes. Robotics and Autonomous Systems, 83, 299-311.
(Continued)

*Primary Examiner* — Luke D Ratcliffe
(74) *Attorney, Agent, or Firm* — ArentFox Schiff LLP

(57) ABSTRACT

The disclosure provides a method for detecting an obstacle, an electronic device, and a storage medium, relates to the field of artificial intelligence, and in particular, to the field of automatic driving. A specific implementation solution includes: acquiring point cloud data collected by a lidar sensor during detection of an obstacle; converting the point cloud data into an obstacle feature map, where the obstacle feature map includes a to-be-detected image feature, and the to-be-detected image feature includes an obstacle feature; performing feature extraction on the to-be-detected image feature in the obstacle feature map to obtain the obstacle feature, increasing a weight value in the obstacle feature map of the obstacle feature during the feature extraction, and monitoring the feature extraction based on monitoring data generated by point cloud distribution data corresponding to the point cloud data; and determining a target obstacle according to the obstacle feature.

18 Claims, 4 Drawing Sheets

(56) References Cited

U.S. PATENT DOCUMENTS

2021/0042557 A1 2/2021 Roy
2021/0056324 A1* 2/2021 Chen ...................... G06V 10/82

FOREIGN PATENT DOCUMENTS

CN 110197215 A 9/2019
CN 110728210 A 1/2020
CN 110879994 A 3/2020
CN 111626314 A 9/2020
CN 112419494 A 2/2021
CN 112444784 A 3/2021
CN 112528979 A 3/2021
CN 112560774 A 3/2021
CN 112698301 A 4/2021
CN 112699806 A 4/2021
CN 112734810 A 4/2021
CN 113052109 A 6/2021
CN 113159151 A 7/2021
CN 113205119 A 8/2021
KR 101899549 B1 9/2018

OTHER PUBLICATIONS

Wu, Y., Wang, Y., Zhang, S., & Ogai, H. (2020). Deep 3D object detection networks using LiDAR Data: A Review. IEEE Sensors Journal, 1-1.

Fernandes, D., Silva, A., Névoa, R., Simões, C., Gonzalez, D., Guevara, M., . . . Melo-Pinto, P. (2021). Point-cloud based 3D object detection and classification methods for self-driving applications: A survey and taxonomy. Information Fusion, 68, 161-191.

European Extended Search Report for European Patent Application No. 22190839.5 dated Dec. 12, 2022.

Japanese 1st Office Action for Japense Patent Application No. 2022-130061 dated Oct. 31, 2023.

* cited by examiner

METHOD FOR DETECTING OBSTACLE, ELECTRONIC DEVICE, AND STORAGE MEDIUM

CROSS-REFERENCE TO RELATED APPLICATIONS

The present disclosure claims priority of Chinese Patent Application No. 202110945486.6, filed to China Patent Office on Aug. 17, 2021. Contents of the present disclosure are hereby incorporated by reference in entirety of the Chinese Patent Application.

TECHNICAL FIELD

The present disclosure relates to the field of an automatic driving technology, and in particular, to a method for detecting an obstacle, an electronic device, and a storage medium.

BACKGROUND OF THE INVENTION

At present, in the field of the automatic driving technology, the performance of obstacle detection has a direct impact on the reliability of the autonomous driving technology. Lidar obstacle detection technology has the characteristics of high precision, high resolution, accurate ranging capability and large detection ranges, which is a main method of obstacle detection in autonomous driving currently. In the methods known to the inventors, there are three main technical solutions of obstacle detection based on lidar, which are an obstacle detection method based on point cloud segmentation, an obstacle detection method based on points, and an obstacle detection method based on lattice distribution.

The obstacle detection method based on point cloud segmentation cannot directly obtain a detection result of a specific obstacle. The obstacle detection method based on points consumes too many resources. The obstacle detection method based on lattice distribution may result in missed detection of obstacles.

In view of the above problems, no effective solution has been proposed yet.

SUMMARY OF THE INVENTION

The present disclosure provides a method for detecting an obstacle, an electronic device, and aa storage medium.

An aspect of the disclosure provides a method for detecting an obstacle. The method includes: acquiring point cloud data collected by a lidar sensor during detection of an obstacle; converting the point cloud data into an obstacle feature map, wherein the obstacle feature map includes a to-be-detected image feature, and the to-be-detected image feature includes an obstacle feature; performing feature extraction on the to-be-detected image feature in the obstacle feature map to obtain the obstacle feature, wherein a weight value in the obstacle feature map of the obstacle feature is increased during the feature extraction, and the feature extraction is monitored based on monitoring data generated by point cloud distribution data corresponding to the point cloud data; and determining a target obstacle according to the obstacle feature.

Optionally, the performing feature extraction on the to-be-detected image feature in the obstacle feature map to obtain the obstacle feature includes: dividing a process of performing the feature extraction on the to-be-detected image feature into an encoding processing stage and a decoding processing stage; performing primary extraction on the to-be-detected image feature based on an attention mechanism at the encoding processing stage to obtain an intermediate image feature; and performing secondary extraction on the intermediate image feature under monitoring according to the monitoring data at the decoding processing stage, to obtain the obstacle feature.

Optionally, the performing primary extraction on the to-be-detected image feature based on an attention mechanism at the encoding processing stage to obtain an intermediate image feature includes: determining a sampling structure of different resolutions based on a size of predetermined obstacle, where the sampling structure is a regular triangle structure; and performing downsampling on the to-be-detected image feature based on the sampling structure at the encoding processing stage, and extracting the intermediate image feature from the to-be-detected image feature.

Optionally, the performing secondary extraction on the intermediate image feature under monitoring according to the monitoring data at the decoding processing stage, to obtain the obstacle feature includes: using the monitoring data to add the point cloud distribution data to the obstacle feature map based on a supervised learning method at the decoding processing stage, and performing upsampling on the obstacle feature map of different resolutions to obtain a processed obstacle feature map; and performing secondary extraction on the intermediate image feature in the processed obstacle feature map, to obtain the obstacle feature.

Optionally, the method further includes: determining the point cloud distribution data according to obstacle distribution information in the point cloud data; determining whether there is a corresponding obstacle in the point cloud data in a case that the point cloud data is not a null value; and generating the monitoring data based on a Gaussian distribution function and the point cloud distribution data when there is the corresponding obstacle in the point cloud data.

Optionally, the determining a target obstacle according to the obstacle feature includes: using the obstacle feature as input data of an obstacle detection model, and receiving an output result of the obstacle detection model; and determining whether an object corresponding to the obstacle feature is the target obstacle based on the output result.

Another aspect of the disclosure provides an apparatus for detecting an obstacle. The apparatus includes an acquisition module, a conversion module, an extraction module, and a determination module. The acquisition module is configured to acquire point cloud data collected by a lidar sensor during detection of an obstacle. The conversion module is configured to convert the point cloud data into an obstacle feature map. The obstacle feature map includes a to-be-detected image feature. The to-be-detected image feature includes an obstacle feature. The extraction module is configured to perform feature extraction on the to-be-detected image feature in the obstacle feature map to obtain the obstacle feature, wherein a weight value in the obstacle feature map of the obstacle feature is increased during the feature extraction, and the feature extraction is monitored based on monitoring data generated by point cloud distribution data corresponding to the point cloud data. The determination module is configured to determine a target obstacle according to the obstacle feature.

Optionally, the extraction module includes a division module, a first extraction sub-module, and a second extraction sub-module. The division module is configured to divide a process of performing the feature extraction on the to-be-detected image feature into an encoding processing stage and a decoding processing stage. The first extraction sub-module is configured to perform primary extraction on the to-be-detected image feature based on an attention mechanism at the encoding processing stage to obtain an intermediate image feature. The second extraction sub-module is configured to perform secondary extraction on the intermediate image feature under monitoring according to the monitoring data at the decoding processing stage, to obtain the obstacle feature.

Optionally, the first extraction sub-module includes a first determination sub-module and a third extraction sub-module. The first determination sub-module is configured to determine a sampling structure of different resolutions based on a size of predetermined obstacle. The sampling structure is a regular triangle structure. The third extraction sub-module is configured to perform downsampling on the to-be-detected image feature based on the sampling structure at the encoding processing stage, and extract the intermediate image feature from the to-be-detected image feature.

Optionally, the second extraction sub-module includes an upsampling processing module and a fourth extraction sub-module. The upsampling processing module is configured to use the monitoring data to add the point cloud distribution data to the obstacle feature map based on a supervised learning method at the decoding processing stage, and perform upsampling on the obstacle feature map of different resolutions to obtain a processed obstacle feature map. The fourth extraction sub-module is configured to perform secondary extraction on the intermediate image feature in the processed obstacle feature map, to obtain the obstacle feature.

Optionally, the apparatus for detecting an obstacle further includes a second determination sub-module, a judgment module, and a generation module. The second determination sub-module is configured to determine the point cloud distribution data according to obstacle distribution information in the point cloud data. The adjustment module is configured to determine whether there is a corresponding obstacle in the point cloud data in a case that the point cloud data is not a null value. The generation module is configured to generate the monitoring data based on a Gaussian distribution function and the point cloud distribution data when there is the corresponding obstacle in the point cloud data.

Optionally, the apparatus further includes a receiving module and a third determination sub-module. The receiving module is configured to use the obstacle feature as input data of an obstacle detection model, and receive an output result of the obstacle detection model. The third determination sub-module is configured to determine whether an object corresponding to the obstacle feature is the target obstacle based on the output result.

Another aspect of the disclosure provides an electronic device. The electronic device includes at least one processor and a memory communicatively connected to the at least one processor. The memory stores an instruction executable by the at least one processor. The instruction is performed by the at least one processor, to cause the at least one processor to perform any one of the method for detecting an obstacle described above.

Another aspect of the disclosure provides a non-transitory computer-readable storage medium storing a computer instruction. The computer instruction is used for a computer to perform any one of the method for detecting an obstacle described above.

Another aspect of the disclosure provides a computer program product. The computer program product includes a computer program. Any of the method for detecting an obstacle described above is implemented when the computer program is performed by a processor.

Another aspect of the disclosure provides an autonomous vehicle. The autonomous vehicle includes an electronic device.

It is to be understood that, the content described in this section is not intended to identify the key or important features of the embodiments of the disclosure, nor is it intended to limit the scope of the disclosure. Other features of the disclosure will become easy to understand through the following description.

BRIEF DESCRIPTION OF THE SEVERAL VIEWS OF THE DRAWINGS

Drawings are used to better understand the solution, and are not intended to limit the disclosure.

DETAILED DESCRIPTION OF THE INVENTION

Exemplary embodiments of the disclosure are described in detail below with reference to the drawings, including various details of the embodiments of the disclosure to facilitate understanding, and should be regarded as merely exemplary. Thus, those of ordinary skilled in the art shall understand that, variations and modifications can be made on the embodiments described herein, without departing from the scope and spirit of the disclosure. Likewise, for clarity and conciseness, descriptions of well-known functions and structures are omitted in the following description.

It is to be noted that terms “first”, “second” and the like in the description, claims and the above mentioned drawings of the disclosure are used for distinguishing similar objects rather than describing a specific sequence or a precedence order. It should be understood that the data used in such a way may be exchanged where appropriate, in order that the embodiments of the disclosure described here can be implemented in an order other than those illustrated or described herein. In addition, terms “include” and “have” and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

Firstly, for ease of understanding an embodiment of the disclosure, some terms or nouns involved in the disclosure are described below.

A lidar obstacle detection technology refers to a technology that uses point cloud data collected by a lidar sensor to detect a 3D obstacle in an autonomous driving scenario.

The point cloud data refers to a set of vectors in a three-dimensional coordinate system.

Embodiment One

An embodiment of the disclosure provides a embodiment of a method for detecting an obstacle. It is to be noted that the steps shown in the flowchart of the accompanying drawings may be executed in a computer system, such as a set of computer-executable instructions, and although a logical sequence is shown in the flowchart, in some cases, the steps shown or described may be executed in a different order than here.

Figure 1:
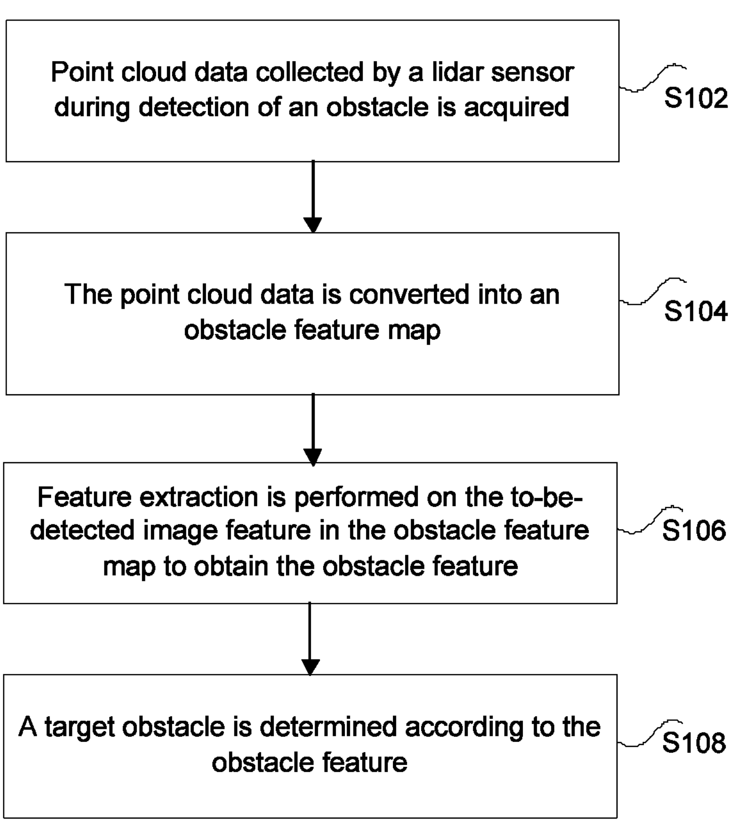
FIG. 1 is a schematic flowchart of steps of a method for detecting an obstacle according to a first embodiment of the disclosure.

FIG. 1 is a schematic flowchart of steps of a method for detecting an obstacle according to a first embodiment of the disclosure. As shown in FIG. 1, the method includes the following steps.

At S102, point cloud data collected by a lidar sensor during detection of an obstacle is acquired.

At S104, the point cloud data is converted into an obstacle feature map. The obstacle feature map includes a to-be-detected image feature, and the to-be-detected image feature includes an obstacle feature.

At S106, feature extraction is performed on the to-be-detected image feature in the obstacle feature map to obtain the obstacle feature, a weight value in the obstacle feature map of the obstacle feature is increased during the feature extraction, and the feature extraction is monitored based on monitoring data generated by point cloud distribution data corresponding to the point cloud data.

At S108, a target obstacle is determined according to the obstacle feature.

Optionally, in this embodiment of the disclosure, the lidar sensor collects the point cloud data during obstacle detection. Before the point cloud data is converted into the to-be-detected image feature in the obstacle feature map, the point cloud data may be divided into a plurality of lattices according to distance information. A point cloud range of the point cloud data is determined according to distribution positions of the point cloud data in the lattices. Therefore, the calculation amount of a model can be effectively reduced, and the detection speed of the obstacle can be accelerated.

Optionally, in this embodiment of the disclosure, based on the point cloud data, the method for detecting an obstacle may directly detect the point cloud data to output a regular frame corresponding to the target obstacle. However, in a case of relatively huge point cloud data, the calculation amount of the model is large, resulting in excessive consumption resources. Therefore, in this embodiment of the disclosure, a neural network structure may further be used to convert the point cloud data into the obstacle feature map. The point cloud data collected by the lidar is divided according to pixels, and then a plurality of obstacle features are obtained through post-processing manners such as clustering.

It is to be noted that, a feature extraction process is divided into an encoding processing stage and a decoding processing stage. A weight value in the obstacle feature map of the obstacle feature is increased at the encoding processing stage to improve an identification degree of the obstacle feature. The feature extraction is monitored based on monitoring data generated by point cloud distribution data corresponding to the point cloud data at the decoding processing stage, so as to further monitor and detect the obstacle feature. Therefore, the detection precision of the obstacles can be improved, and missed detection and/or false detection of the obstacles can be reduced.

In an embodiment of the disclosure, point cloud data collected by a lidar sensor during detection of an obstacle is acquired. The point cloud data is converted into an obstacle feature map. The obstacle feature map includes a to-be-detected image feature. The to-be-detected image feature includes an obstacle feature. Feature extraction is performed on the to-be-detected image feature in the obstacle feature map to obtain the obstacle feature, a weight value in the obstacle feature map of the obstacle feature is increased during the feature extraction, and the feature extraction is monitored based on monitoring data generated by point cloud distribution data corresponding to the point cloud data. A target obstacle is determined according to the obstacle feature. In this way, a purpose of enhancing the feature extraction efficiency of obstacle image can be achieved, and the technical effect of enhancing obstacle detection precision and detection efficiency and reducing resource loss and improving the reliability of an obstacle detection technology in an autonomous driving system can be achieved. Therefore, the technical problems of huge amount of calculation, excessive resource consumption, missed detection and/or false detection of obstacles due to the excessive amount of point cloud data during detection of the obstacles by lidar can be resolved.

Figure 2:
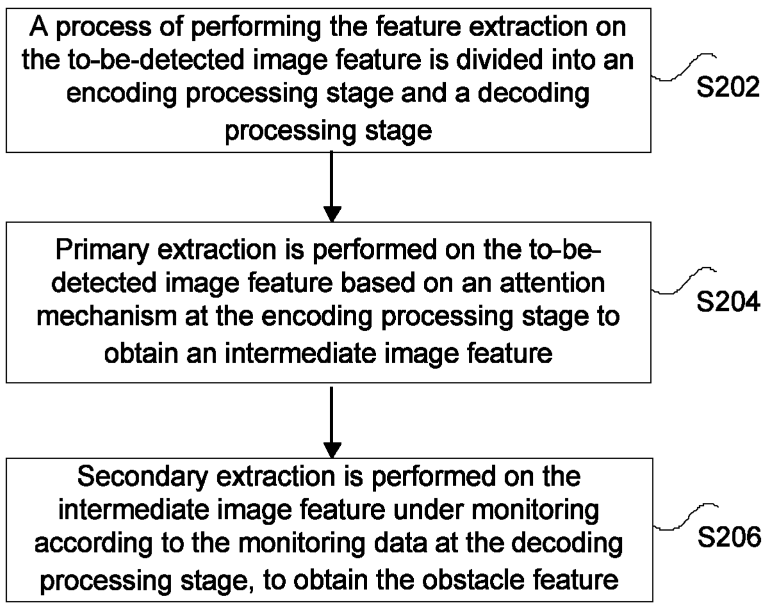
FIG. 2 is a schematic flowchart of steps of an optional method for detecting an obstacle according to a first embodiment of the disclosure.

As an optional embodiment, FIG. 2 is a schematic flowchart of steps of an optional method for detecting an obstacle according to a first embodiment of the disclosure. As shown in FIG. 2, the performing feature extraction on the to-be-detected image feature in the obstacle feature map to obtain the obstacle feature includes the following steps.

At S202, a process of performing the feature extraction on the to-be-detected image feature is divided into an encoding processing stage and a decoding processing stage.

At S204, primary extraction is performed on the to-be-detected image feature based on an attention mechanism at the encoding processing stage to obtain an intermediate image feature.

At S206, secondary extraction is performed on the intermediate image feature under monitoring according to the monitoring data at the decoding processing stage, to obtain the obstacle feature.

It is to be noted that, although the lidar may collect high-quality point cloud data and have accurate distance information, due to shielding or distance factors, some obstacles may have a small number of point clouds, it is necessary to avoid missed detection and false detection caused by inconspicuous obstacle features during the detection of the obstacles. In this embodiment of the disclosure, a process of performing the feature extraction on the to-be-detected image feature is divided into the encoding processing stage and the decoding processing stage. At the encoding processing stage, the attention mechanism is used to increase the weight in an image feature of the obstacles. The sampling structure of different resolutions is determined based on the size of the predetermined obstacle. Downsampling is performed on the to-be-detected image feature based on the sampling structure, to extract an effective obstacle feature. At the decoding processing stage, the monitoring data is used to add the point cloud distribution data to the obstacle feature map based on a supervised learning method. Upsampling is performed on the obstacle feature map of different resolutions to obtain an obstacle feature map with a same resolution, and the obstacle feature map with the same resolution is spliced.

Optionally, the point cloud distribution data is determined according to obstacle distribution information in the point cloud data. Whether there is a corresponding obstacle in the point cloud data is determined in a case that the point cloud data is not a null value. The monitoring data is generated based on a Gaussian distribution function and the point cloud distribution data when there is the corresponding obstacle in the point cloud data.

In this embodiment of the disclosure, the process performing the feature extraction on the to-be-detected image feature is divided into the encoding processing stage and the decoding processing stage. Primary extraction is performed on the to-be-detected image feature based on an attention mechanism at the encoding processing stage to obtain the intermediate image feature. Secondary extraction is performed on the intermediate image feature under monitoring according to the monitoring data at the decoding processing stage, to obtain the obstacle feature. Therefore, purposes of increasing the weight in the feature map of the obstacle and improving the detection precision of the obstacle can be achieved, and the technical effect of improving the identification degree of the obstacle feature and reducing missed detection and/or false detection of the obstacles can be realized.

In an optional embodiment, the performing primary extraction on the to-be-detected image feature based on an attention mechanism at the encoding processing stage to obtain an intermediate image feature includes the following steps.

At S302, a sampling structure of different resolutions is determined based on a size of predetermined obstacle. The sampling structure is a regular triangle structure.

At S304, downsampling is performed on the to-be-detected image feature based on the sampling structure at the encoding processing stage, and the intermediate image feature is extracted from the to-be-detected image feature.

Optionally, primary extraction is performed on the to-be-detected image feature based on the attention mechanism at the encoding processing stage to obtain the intermediate image feature. The attention mechanism is used for increasing the weight in the feature map of the obstacle, and may be expressed by using a formula $T^*(x)=(1+M(x))*T(x)$, wherein $M(x)$ represents an output image feature of an attention module of the to-be-detected image feature, $T(x)$ represents an output image feature of a main module of the to-be-detected image feature, and $T^*(x)$ represents an output image feature after the weight is increased. The sampling structure of different resolutions is determined based on the size of the predetermined obstacle. Downsampling is performed, based on the sampling structure, on the output image feature after the weight is increased, and the intermediate image feature is extracted from the output image feature after the weight is increased.

In this embodiment, the performing primary extraction on the to-be-detected image feature based on an attention mechanism at the encoding processing stage to obtain an intermediate image feature includes: determining a sampling structure of different resolutions based on a size of predetermined obstacle, wherein the sampling structure is a regular triangle structure; and performing downsampling on the to-be-detected image feature based on the sampling structure at the encoding processing stage, and extracting the intermediate image feature from the to-be-detected image feature. Therefore, a purpose of increasing the weight in the feature map of the obstacle can be achieved, so as to realize the technical effect of improving the identification degree of the obstacle feature.

Figure 3:
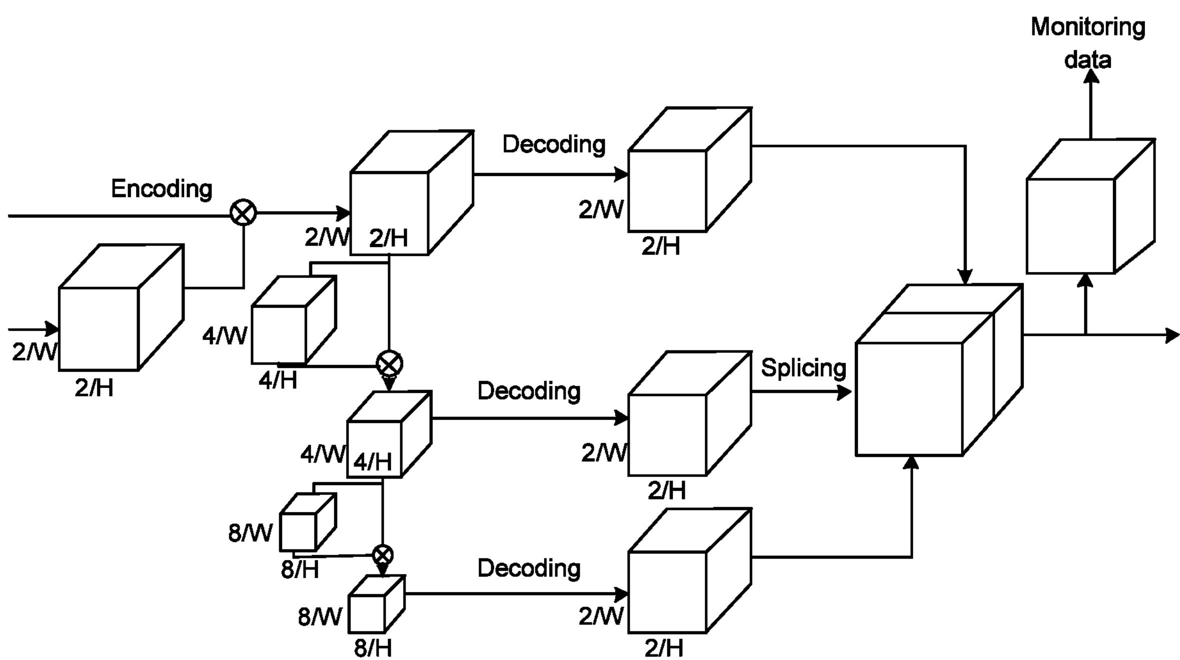
FIG. 3 is a schematic flowchart of optional steps of training a model for detecting an obstacle according to a first embodiment of the disclosure.

As an optional embodiment, FIG. 3 is a schematic flowchart of optional steps of training a model for detecting an obstacle according to a first embodiment of the disclosure. As shown in FIG. 3, for an encoding stage (Conv), the attention mechanisms are simultaneously added in the obstacle feature map of three different resolutions (corresponding to convolution kernels of 2×2, 4×4, and 8×8, wherein W is a width, and H is a height). Convolution and device convolution transform are continuously performed on the model for detecting an obstacle during training. Still as shown in FIG. 3, at the decoding processing stage Deconv, the obstacle feature map of the three different resolutions are converted into a convolution kernel of 2×2. In this way, the weight of an area where the obstacle is located is determined through continuous training and learning, and the resolution of the obstacle feature in the obstacle feature map can be improved.

As an optional embodiment, the performing secondary extraction on the intermediate image feature under monitoring according to the monitoring data at the decoding processing stage, to obtain the obstacle feature includes the following steps.

At S402, at the decoding processing stage, the monitoring data is used to add the point cloud distribution data to the obstacle feature map based on a supervised learning method, and upsampling is performed on the obstacle feature map of different resolutions to obtain a processed obstacle feature map.

At S404, secondary extraction is performed on the intermediate image feature in the processed obstacle feature map, to obtain the obstacle feature.

Optionally, still as shown in FIG. 3, at the decoding processing stage (Deconv), upsampling is performed on the obstacle feature map of different resolutions. That is to say, the feature map with different resolutions is upsampled to a same resolution, and the feature map with the same resolution is spliced (Concat) to act as an input of a further obstacle detection stage.

It is to be noted that, due to multi-layer training and downsampling of the model for detecting an obstacle, some obstacles with sparse point cloud data or relatively small obstacles may be ignored, which is also an important reason for the missed detection of the model. Therefore, in this embodiment of the disclosure, the distribution of the obstacle in the obstacle feature map is fully considered. That is to say, when the obstacle feature map is inputted to a detection module, the integrity of obstacle information in the obstacle feature map can be guaranteed, and meanwhile, large weight distribution in the feature map of the obstacles can be guaranteed. The key for guaranteeing the integrity of obstacle information in the obstacle feature map lies in that the obstacle information on the obstacle feature map is effectively encoded without damaging a network structure. Extra monitoring is performed on the feature image before a monitoring module is inputted based on the monitoring data of original point cloud data. The obstacle distribution information is put into the obstacle feature map through the supervised learning method. Upsampling is performed on the obstacle feature map of different resolutions to obtain the processed obstacle feature map. The intermediate image feature in the processed obstacle feature map is further extracted to obtain the obstacle feature. In this way, on the basis of protecting the network structure, the obstacle information is effectively encoded on the obstacle feature map, so that the purpose of obtaining effective obstacle features is achieved.

Figure 4:
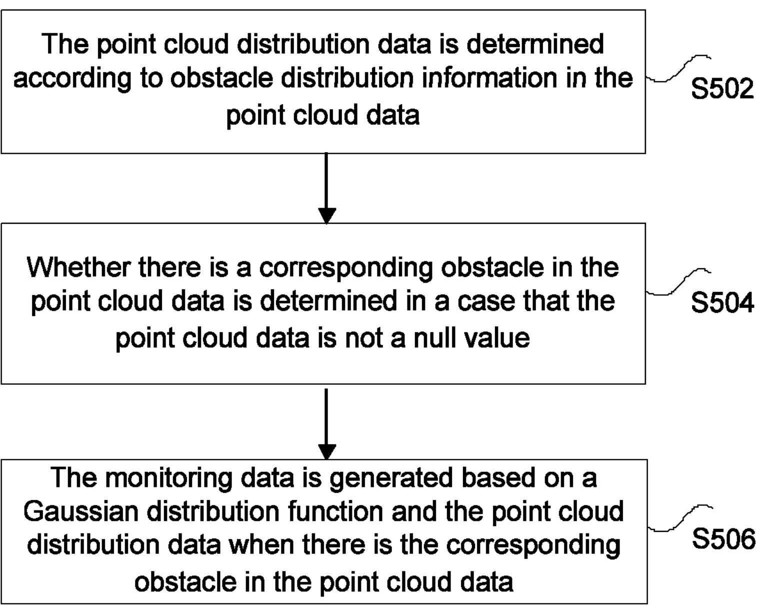
FIG. 4 is a schematic flowchart of steps of another optional method for detecting an obstacle according to a first embodiment of the disclosure.

As an optional embodiment, FIG. 4 is a schematic flowchart of steps of another optional method for detecting an obstacle according to a first embodiment of the disclosure. As shown in FIG. 4, the method further includes the following steps.

At S502, the point cloud distribution data is determined according to obstacle distribution information in the point cloud data.

At S504, whether there is a corresponding obstacle in the point cloud data is determined in a case that the point cloud data is not a null value.

At S506, the monitoring data is generated based on a Gaussian distribution function and the point cloud distribution data when there is the corresponding obstacle in the point cloud data.

Optionally, a specific formula for generating the monitoring data based on the Gaussian distribution function and the point cloud distribution data is shown as follows.

$$Y = \exp\left(-\frac{(x-p_x)^2+(y-p_y)^2}{2\sigma^2}\right)$$

Y is the monitoring data, x and y are components of the point cloud coordinates of each obstacle on an x axis and a y axis, respectively, px and py are average values of the components of the point cloud coordinates of each obstacle on the x axis and the y axis, and $\sigma^2$ is a standard deviation of the point cloud coordinates of each obstacle.

In this embodiment, the monitoring data is generated based on obstacle distribution in original point cloud distribution. During the acquiring of the monitoring data, points of which point cloud data is not a null value are first obtained. Whether the points belong to the obstacle is determined. If so, the corresponding monitoring data is generated based on Gaussian distribution, to generate the monitoring data based on the original point cloud data so as to perform extra monitoring on the feature map before the monitoring module is inputted. On the basis of protecting the network structure, the obstacle information is effectively encoded on the obstacle feature map. Therefore, the detection precision of the obstacles can be improved, and missed detection and/or false detection of the obstacles can be reduced.

Optionally, when a distance between two or more obstacle points is less than a preset value, and/or the obstacle points intersect with each other, the maximum monitoring data in the two or more obstacle points is selected as the monitoring data of an area where two or more obstacle points are located.

As an optional embodiment, the determining a target obstacle according to the obstacle feature includes the following steps.

At S602, the obstacle feature is used as input data of a model for detecting an obstacle, and an output result of the model for detecting an obstacle is received.

At S604, whether an object corresponding to the obstacle feature is the target obstacle is determined based on the output result.

Optionally, the obstacle feature is used as the input of the model for detecting an obstacle, and the output result of the model for detecting an obstacle is received. Whether the object corresponding to the obstacle feature is the target obstacle is determined based on the output result. That is to say, in this embodiment of the disclosure, the model for detecting an obstacle may be adopted to detect whether the object corresponding to the obstacle feature is the target obstacle.

It is to be noted that, the method for detecting an obstacle in this embodiment of the disclosure is applicable to an autonomous vehicle. The output result of the model for detecting an obstacle may be used as the basis for decision-making of driving state of the autonomous vehicle. A type of the autonomous vehicle includes, but is not limited to, a private car, a bus, a rail operation train (such as a train, a subway, a high-speed rail, and the like). An unmanned vehicle may include, but is not limited to, operating states such as unsupervised operation and supervised operation.

It is still to be noted that, for optional or preferred implementations of this embodiment, refer to the relevant descriptions in the foregoing embodiments of an information prompting method of the vehicle, which are not described herein again. In the technical solution of the disclosure, the involved acquisition, storage, and application of personal information of a user are in compliance with relevant laws and regulations, and does not violate public order and good customs.

Embodiment Two

Figure 5:
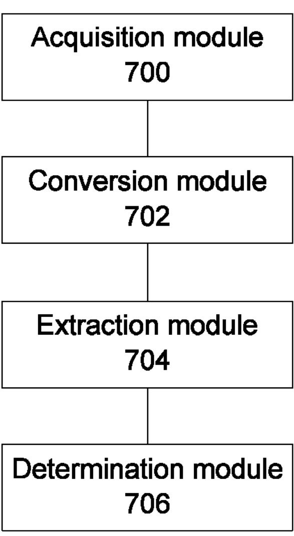
FIG. 5 is a schematic structural diagram of an apparatus for detecting an obstacle according to a second embodiment of the disclosure.

According to this embodiment of the disclosure, a embodiment of an apparatus for implementing the method for detecting an obstacle is further provided. FIG. 5 is a schematic structural diagram of an apparatus for detecting an obstacle according to a second embodiment of the disclosure. As shown in FIG. 5, the apparatus for detecting an obstacle includes an acquisition module 700, a conversion module 702, an extraction module 704, and a determination module 706.

The acquisition module 700 is configured to acquire point cloud data collected by a lidar sensor during detection of an obstacle. The conversion module 702 is configured to convert the point cloud data into an obstacle feature map. The obstacle feature map includes a to-be-detected image feature. The to-be-detected image feature includes an obstacle feature. The extraction module 704 is configured to perform feature extraction on the to-be-detected image feature in the obstacle feature map to obtain the obstacle feature, increase a weight value in the obstacle feature map of the obstacle feature during the feature extraction, and monitor the feature extraction based on monitoring data generated by point cloud distribution data corresponding to the point cloud data. The determination module 706 is configured to determine a target obstacle according to the obstacle feature.

Optionally, in this embodiment of the disclosure, the lidar sensor collects the point cloud data during obstacle detection. Before the point cloud data is converted into the to-be-detected image feature in the obstacle feature map, the point cloud data may be divided into a plurality of lattices according to distance information. A point cloud range of the point cloud data is determined according to distribution positions of the point cloud data in the lattices. Therefore, the calculation amount of a model can be effectively reduced, and the detection speed of the obstacle can be accelerated.

Optionally, in this embodiment of the disclosure, based on the point cloud data, the method for detecting an obstacle may directly detect the point cloud data to output a regular frame corresponding to the target obstacle. However, in a case of relatively huge point cloud data, the calculation amount of the model is large, resulting in excessive consumption resources. Therefore, in this embodiment of the disclosure, a neural network structure may further be used to convert the point cloud data into the obstacle feature map. The point cloud data collected by the lidar is divided according to pixels, and then a plurality of obstacle features are obtained through post-processing manners such as clustering.

It is to be noted that, a feature extraction process is divided into an encoding processing stage and a decoding processing stage. A weight value in the obstacle feature map of the obstacle feature is increased at the encoding processing stage to improve an identification degree of the obstacle feature. The feature extraction is monitored based on monitoring data generated by point cloud distribution data corresponding to the point cloud data at the decoding processing stage, so as to further monitor and detect the obstacle feature. Therefore, the detection precision of the obstacles can be improved, and missed detection and/or false detection of the obstacles can be reduced.

In this embodiment of the disclosure, the acquisition module 700 is configured to acquire point cloud data collected by a lidar sensor during detection of an obstacle. The conversion module 702 is configured to convert point cloud data into an obstacle feature map. The obstacle feature map includes a to-be-detected image feature. The to-be-detected image feature includes an obstacle feature. The extraction module 704 is configured to perform feature extraction on the to-be-detected image feature in the obstacle feature map to obtain the obstacle feature. A weight value in the obstacle feature map of the obstacle feature is increased during the feature extraction. The feature extraction is monitored based on monitoring data generated by point cloud distribution data corresponding to the point cloud data. The determination module 706 is configured to determine a target obstacle according to the obstacle feature. In this way, a purpose of enhancing the feature extraction efficiency of obstacle image can be achieved, and the technical effect of enhancing obstacle detection precision and detection efficiency and reducing resource loss and improving the reliability of an obstacle detection technology in an autonomous driving system can be achieved. Therefore, the technical problems of huge amount of calculation, excessive resource consumption, missed detection and/or false detection of obstacles due to the excessive amount of point cloud data during detection of the obstacles by lidar can be resolved.

It is to be noted that, each of the above modules may be implemented by software or hardware. For example, for the latter, it may be implemented in the following manners: the above modules are all located in a same processor; or the above modules are located in different processors in any combination.

It is to be noted herein that, the acquisition module 700, the conversion module 702, the extraction module 704, and the determination module 706 correspond to S102 to S108 in Embodiment 1, examples and application scenarios implemented by the above modules and the corresponding steps are the same, but are not limited to the contents disclosed in Embodiment 1. It is to be noted that, the above modules are used as a part of the apparatus, and may be operated in a computer terminal.

Figure 6:
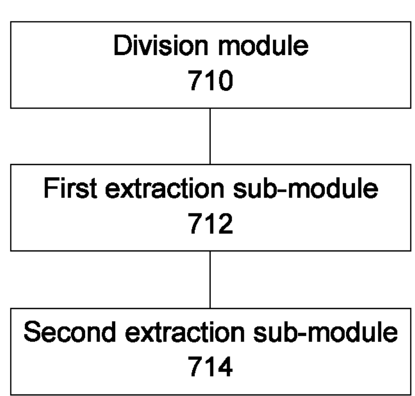
FIG. 6 is a schematic structural diagram of an optional apparatus for detecting an obstacle according to a second embodiment of the disclosure.

As an optional embodiment, FIG. 6 is a schematic structural diagram of an optional apparatus for detecting an obstacle according to a second embodiment of the disclosure. As shown in FIG. 6, the extraction module 704 includes a division module 710, a first extraction sub-module 712, and a second extraction sub-module 714.

The division module 710 is configured to divide a process of performing the feature extraction on the to-be-detected image feature into an encoding processing stage and a decoding processing stage. The first extraction sub-module 712 is configured to perform primary extraction on the to-be-detected image feature based on an attention mechanism at the encoding processing stage to obtain an intermediate image feature. The second extraction sub-module 714 is configured to perform secondary extraction on the intermediate image feature under monitoring according to the monitoring data at the decoding processing stage, to obtain the obstacle feature.

It is to be noted that, although the lidar may collect high-quality point cloud data and have accurate distance information, due to shielding or distance factors, some obstacles may have a small number of point clouds, it is necessary to avoid missed detection and false detection caused by inconspicuous obstacle features during the detection of the obstacles. In this embodiment of the disclosure, a process of performing the feature extraction on the to-be-detected image feature is divided into the encoding processing stage and the decoding processing stage. At the encoding processing stage, the attention mechanism is used to increase the weight in an image feature of the obstacles. The sampling structure of different resolutions is determined based on the size of the predetermined obstacle. Downsampling is performed on the to-be-detected image feature based on the sampling structure, to extract an effective obstacle feature. At the decoding processing stage, the monitoring data is used to add the point cloud distribution data to the obstacle feature map based on a supervised learning method. Upsampling is performed on the obstacle feature map of different resolutions to obtain an obstacle feature map with a same resolution, and the obstacle feature map with the same resolution is spliced.

Optionally, the point cloud distribution data is determined according to obstacle distribution information in the point cloud data. Whether there is a corresponding obstacle in the point cloud data is determined in a case that the point cloud data is not a null value. The monitoring data is generated based on a Gaussian distribution function and the point cloud distribution data when there is the corresponding obstacle in the point cloud data.

In this embodiment of the disclosure, the division module 710 is configured to divide a process performing feature extraction on the to-be-detected image feature into the encoding processing stage and the decoding processing stage. The first extraction sub-module 712 is configured to perform primary extraction on the to-be-detected image feature based on an attention mechanism at the encoding processing stage to obtain the intermediate image feature. The second extraction sub-module 714 is configured to perform secondary extraction on the intermediate image feature under monitoring according to the monitoring data at the decoding processing stage, to obtain the obstacle feature. Therefore, purposes of increasing the weight in the feature map of the obstacle and improving the detection precision of the obstacle can be achieved, and the technical effect of improving the identification degree of the obstacle feature and reducing missed detection and/or false detection of the obstacles can be realized.

In an optional embodiment, the first extraction sub-module 712 includes a first determination sub-module 720 and a third extraction sub-module 722.

The first determination sub-module 720 is configured to determine a sampling structure of different resolutions based on a size of predetermined obstacle. The sampling structure is a regular triangle structure. The third extraction sub-module 722 is configured to perform downsampling on the to-be-detected image feature based on the sampling structure at the encoding processing stage, and extract the intermediate image feature from the to-be-detected image feature.

Optionally, primary extraction is performed on the to-be-detected image feature based on the attention mechanism at the encoding processing stage to obtain the intermediate image feature. The attention mechanism is used for increasing the weight in the feature map of the obstacle, and may be expressed by using a formula $T^*(x)=(1+M(x))^*T(x)$, wherein M(x) represents an output image feature of an attention module of the to-be-detected image feature, T(x) represents an output image feature of a main module of the to-be-detected image feature, and T*(x) represents an output image feature after the weight is increased. The sampling structure of different resolutions is determined based on the size of the predetermined obstacle. Downsampling is performed, based on the sampling structure, on the output image feature after the weight is increased, and the intermediate image feature is extracted from the output image feature after the weight is increased.

In this embodiment, the first determination sub-module 720 is configured to determine a sampling structure of different resolutions based on a size of predetermined obstacle. The sampling structure is a regular triangle structure. The third extraction sub-module 722 is configured to perform downsampling on the to-be-detected image feature based on the sampling structure at the encoding processing stage, and extract the intermediate image feature from the to-be-detected image feature. Therefore, a purpose of increasing the weight in the feature map of the obstacle can be achieved, so as to realize the technical effect of improving the identification degree of the obstacle feature.

As an optional embodiment, FIG. 3 shows the flow of training a model for detecting an obstacle. For an encoding stage (Cony), the attention mechanisms are simultaneously added in the obstacle feature map of three different resolutions (corresponding to convolution kernels of 2×2, 4×4, and 8×8, wherein W is a width, and H is a height). Convolution and device convolution transform are continuously performed on the model for detecting an obstacle during training. Still as shown in FIG. 3, at the decoding processing stage Deconv, the obstacle feature map of the three different resolutions are converted into a convolution kernel of 2×2. In this way, the weight of an area where the obstacle is located is determined through continuous training and learning, and the resolution of the obstacle feature in the obstacle feature map can be improved.

In an optional embodiment, the second extraction sub-module 714 includes an upsampling processing module 730 and a fourth extraction sub-module 732.

The upsampling processing module 730 is configured to use the monitoring data to add the point cloud distribution data to the obstacle feature map based on a supervised learning method at the decoding processing stage, and perform upsampling on the obstacle feature map of different resolutions to obtain a processed obstacle feature map. The fourth extraction sub-module 732 is configured to perform secondary extraction on the intermediate image feature in the processed obstacle feature map, to obtain the obstacle feature.

Optionally, still as shown in FIG. 3, at the decoding processing stage (Deconv), upsampling is performed on the obstacle feature map of different resolutions. That is to say, the feature map with different resolutions is upsampled to a same resolution, and the feature map with the same resolution is spliced (Concat) to act as an input of a further obstacle detection stage.

It is to be noted that, due to multi-layer training and downsampling of the model for detecting an obstacle, some obstacles with sparse point cloud data or relatively small obstacles may be ignored, which is also an important reason for the missed detection of the model. Therefore, in this embodiment of the disclosure, the distribution of the obstacle in the obstacle feature map is fully considered. That is to say, when the obstacle feature map is inputted to a detection module, the integrity of obstacle information in the obstacle feature map can be guaranteed, and meanwhile, large weight distribution in the feature map of the obstacles can be guaranteed. The key for guaranteeing the integrity of obstacle information in the obstacle feature map lies in that the obstacle information on the obstacle feature map is effectively encoded without damaging a network structure. Extra monitoring is performed on the feature image before a monitoring module is inputted based on the monitoring data of original point cloud data. The obstacle distribution information is put into the obstacle feature map through the supervised learning method. Upsampling is performed on the obstacle feature map of different resolutions to obtain the processed obstacle feature map. The intermediate image feature in the processed obstacle feature map is further extracted to obtain the obstacle feature. In this way, on the basis of protecting the network structure, the obstacle information is effectively encoded on the obstacle feature map, so that the purpose of obtaining effective obstacle features is achieved.

Figure 7:
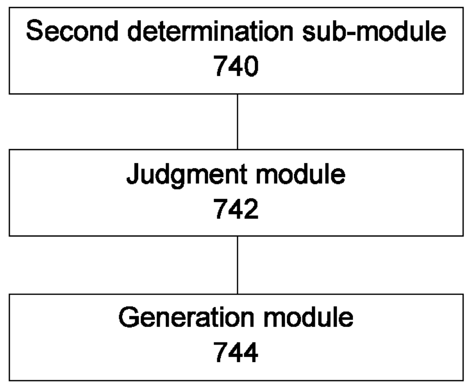
FIG. 7 is a schematic structural diagram of another optional apparatus for detecting an obstacle according to a second embodiment of the disclosure.

As an optional embodiment, FIG. 7 is a schematic structural diagram of another optional apparatus for detecting an obstacle according to a second embodiment of the disclosure. As shown in FIG. 7, the apparatus for detecting an obstacle further includes a second determination sub-module 740, a judgment module 742, and a generation module 744.

The second determination sub-module 740 is configured to determine the point cloud distribution data according to obstacle distribution information in the point cloud data. The judgment module 742 is configured to determine whether there is a corresponding obstacle in the point cloud data in a case that the point cloud data is not a null value. The generation module 744 is configured to generate the monitoring data based on a Gaussian distribution function and the point cloud distribution data when there is the corresponding obstacle in the point cloud data.

Optionally, a specific formula for generating the monitoring data based on the Gaussian distribution function and the point cloud distribution data is shown as follows.

$$Y = \exp\left(-\frac{(x-p_x)^2+(y-p_y)^2}{2\sigma^2}\right)$$

Y is the monitoring data, x and y are components of the point cloud coordinates of each obstacle on an x axis and a y axis, respectively, px and py are average values of the components of the point cloud coordinates of each obstacle on the x axis and the y axis, and $\sigma^2$ is a standard deviation of the point cloud coordinates of each obstacle.

In this embodiment, the monitoring data is generated based on obstacle distribution in original point cloud distribution. During the acquiring of the monitoring data, points of which point cloud data is not a null value are first obtained. Whether the points belong to the obstacle is determined. If so, the corresponding monitoring data is generated based on Gaussian distribution, to generate the monitoring data based on the original point cloud data so as to perform extra monitoring on the feature map before the monitoring module is inputted. On the basis of protecting the network structure, the obstacle information is effectively encoded on the obstacle feature map. Therefore, the detection precision of the obstacles can be improved, and missed detection and/or false detection of the obstacles can be reduced.

Optionally, when a distance between two or more obstacle points is less than a preset value, and/or the obstacle points intersect with each other, the maximum monitoring data in the two or more obstacle points is selected as the monitoring data of an area where two or more obstacle points are located.

In an optional embodiment, the apparatus for detecting an obstacle further includes a receiving module 750 and a third determination sub-module 752.

The receiving module 750 is configured to use the obstacle feature as input data of an obstacle detection model, and receive an output result of the obstacle detection model. The third determination sub-module 752 is configured to determine whether an object corresponding to the obstacle feature is the target obstacle based on the output result.

Optionally, the obstacle feature is used as the input of the model for detecting an obstacle, and the output result of the model for detecting an obstacle is received. Whether the object corresponding to the obstacle feature is the target obstacle is determined based on the output result. That is to say, in this embodiment of the disclosure, the model for detecting an obstacle may be adopted to detect whether the object corresponding to the obstacle feature is the target obstacle.

It is to be noted that, the method for detecting an obstacle in this embodiment of the disclosure is applicable to an autonomous vehicle. The output result of the model for detecting an obstacle may be used as the basis for decision-making of a formal state of the autonomous vehicle. A type of the autonomous vehicle includes, but is not limited to, a private car, a bus, a rail operation train (such as a train, a subway, a high-speed rail, and the like). An unmanned vehicle may include, but is not limited to, operating states such as unsupervised operation and supervised operation.

An information prompting apparatus of the vehicle may further include a processor and a memory. The acquisition module 700, the conversion module 702, the extraction module 704, and the determination module 706 are all stored in the memory as program units, and the processor executes the program units stored in the memory to implement corresponding functions.

The processor includes a kernel, and the kernel invokes the corresponding program unit from the memory, and one or more of the above kernels may be disposed. The memory may include a non-persistent memory in a computer-readable medium, a random access memory (RAM) and/or a non-volatile memory, for example, a read only memory (ROM) or a flash memory (flash RAM). The memory includes at least one memory chip.

It is still to be noted that, for optional or preferred implementations of this embodiment, refer to the relevant descriptions in Embodiment 1, which are not described herein again. In the technical solution of the disclosure, the involved acquisition, storage, and application of personal information of a user are in compliance with relevant laws and regulations, and do not violate public order and good customs.

Embodiment Three

According to an embodiment of the disclosure, the disclosure further provides an electronic device, a readable storage medium, and a computer program product.

Figure 8:
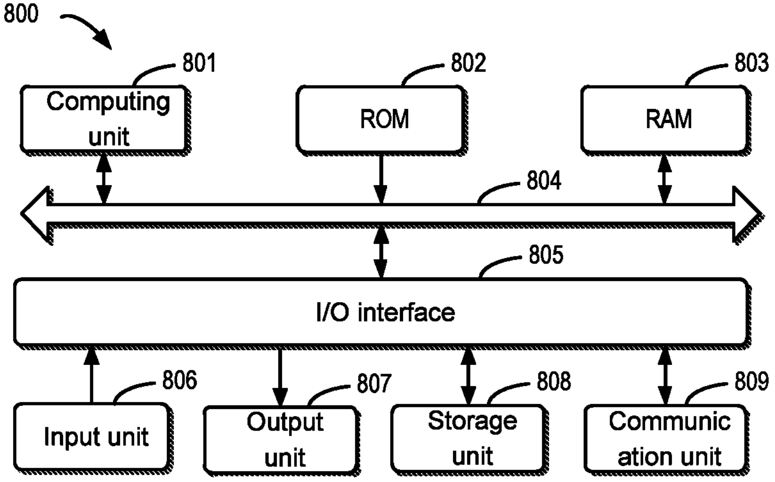
FIG. 8 is a schematic block diagram of an electronic device configured to implement a method for detecting an obstacle according to an embodiment of the disclosure.

FIG. 8 is a schematic block diagram of an example electronic device 800 configured to implement an embodiment of the disclosure. The electronic device is intended to represent various forms of digital computers, such as laptop computers, desktop computers, workbenches, personal digital assistants, servers, blade servers, mainframe computers, and other suitable computers. The electronic device may also express various forms of mobile devices, such as personal digital processing, cellular phones, smart phones, wearable devices, and other similar computing devices. The components shown herein, connections and relationships of the components, and functions of the components are merely examples, and are not intended to limit the implementation of the disclosure described and/or required herein.

As shown in FIG. 8, the device 800 includes a computing unit 801. The computing unit may perform various appropriate actions and processing operations according to a computer program stored in an ROM 802 or a computer program loaded from a storage unit 808 into an RAM 803. In the RAM 803, various programs and data required for the operation of the device 800 may also be stored. The computing unit 801, the ROM 802, and the RAM 803 are connected to each other by using a bus 804. An input/output (I/O) interface 805 is also connected to the bus 804.

A plurality of components in the device 800 are connected to the I/O interface 805, and include: an input unit 806, such as a keyboard and a mouse; an output unit 807, such as various types of displays and loudspeakers; the storage unit 808, such as a disk and an optical disc; and a communication unit 809, such as a network card, a modem, and a wireless communication transceiver. The communication unit 809 allows the device 800 to exchange information/data with other devices through a computer network, such as the Internet, and/or various telecommunication networks.

The computing unit 801 may be various general and/or special processing assemblies with processing and computing capabilities. Some examples of computing unit 801 include, but are not limited to, a central processing unit (CPU), a graphics processing unit (GPU), various dedicated artificial intelligence (AI) computing chips, various computing units for running machine learning model algorithms, a digital signal processor (DSP), and any appropriate processors, controllers, microcontrollers, etc. The computing unit 801 performs each method and processing described as above. For example, the method includes acquiring point cloud data collected by a lidar sensor during detection of an obstacle. For example, in some embodiments, the method of acquiring the point cloud data collected by the lidar sensor during detection of the obstacle may be implemented as a computer software program, which is tangibly included in a machine-readable medium, such as the storage unit 808. In some embodiments, part or all of the computer program may be loaded and/or installed on the device 800 via the ROM 802 and/or the communication unit 809. When the computer program is loaded into the RAM 803 and performed by the computing unit 801, one or more steps in the method of acquiring the point cloud data collected by the lidar sensor during detection of the obstacle described above may be performed. Alternatively, in other embodiments, the computing unit 801 may be configured to perform the method of acquiring the point cloud data collected by the lidar sensor during detection of the obstacle in any other suitable manners (for example, by means of firmware).

According to an embodiment of the disclosure, the disclosure further provides an autonomous vehicle. The autonomous vehicle includes the electronic device.

Optionally, a type of the autonomous vehicle includes, but is not limited to, a private car, a bus, a rail operation train (such as a train, a subway, a high-speed rail, and the like). An unmanned vehicle may include, but is not limited to, operating states such as unsupervised operation and supervised operation.

The various implementations of systems and technologies described herein may be implemented in a digital electronic circuit system, an integrated circuit system, a field programmable gate array (FPGA), an application-specific integrated circuit (ASIC), an application-specific standard product (ASSP), a system-on-chip (SOC), a complex programmable logic device (CPLD), computer hardware, firmware, software, and/or a combination thereof. These various implementations may include: being implemented in one or more computer programs, the one or more computer programs may be performed and/or interpreted on a programmable system including at least one programmable processor. The programmable processor may be a dedicated or general programmable processor, which can receive data and instructions from a storage system, at least one input device, and at least one output device, and transmit the data and instructions to the storage system, the at least one input device, and the at least one output device.

Program codes used to implement the method of the disclosure can be written in any combination of one or more programming languages. These program codes can be provided to the processors or controllers of general computers, special computers, or other programmable data processing devices, so that, when the program codes are performed by the processors or controllers, functions/operations specified in the flowcharts and/or block diagrams are implemented. The program codes can be performed entirely on a machine, partially performed on the machine, and partially performed on the machine and partially performed on a remote machine as an independent software package, or entirely performed on the remote machine or a server.

In the context of the disclosure, a machine-readable medium may be a tangible medium, which may include or store a program for being used by an instruction execution system, device, or apparatus or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any foregoing suitable combinations. More specific examples of the machine-readable storage medium may include electrical connections based on one or more wires, a portable computer disk, a hard disk, an RAM, an ROM, an erasable programmable read-only memory (EPROM or flash memory), an optical fiber, a portable compact disk read-only memory (CD-ROM), an optical storage device, a magnetic storage device, or any above suitable combinations.

In order to provide interaction with a user, the system and technologies described herein can be implemented on a computer, including a display device for displaying information to the user (for example, a cathode ray tube (CRT) or a liquid crystal display (LCD) monitor), a keyboard and a pointing device (for example, a mouse or a trackball). The user can provide an input to the computer by using the keyboard and the pointing device. Other types of devices may also be configured to provide interaction with the user, for example, the feedback provided to the user may be any form of sensory feedback (such as visual feedback, auditory feedback, or tactile feedback), and may be the input from the user received in any form (including acoustic input, voice input, or tactile input).

The system and technologies described herein may be implemented in a computing system (for example, as a data server) including a back-end component, or a computing system (for example, an application server) including a middleware component, or a computing system (for example, a user computer with a graphical user interface or network browser, the user may be in interaction with implementations of the system and technologies described herein by using the graphical user interface or network browser) including a front-end component, or a computing system including any combination of the back-end component, the middleware component, or the front-end component. The components of the system can be connected to each other through any form or digital data communication (for example, a communication network) of the medium. Examples of the communication network include a local area network (LAN), a wide area network (WAN), and the Internet.

The computer system may include a client and a server. The client and the server are generally far away from each other and usually interact by means of the communication network. A relationship between the client and the server is generated by the computer program that is run on the corresponding computer and has a client-server relationship with each other. The server may be a cloud server, and may also be a distributed system server, or a server combined with a blockchain.

It is to be understood that, the steps may be reordered, added or deleted by using various forms of programs shown above. For example, the steps described in the disclosure may be performed parallelly, sequentially, or in a different order, as long as desired results of the technical solutions disclosed in the disclosure can be achieved, which are not limited herein.

The foregoing specific implementations do not constitute limitations on the protection scope of the disclosure. Those skilled in the art should understand that, various modifications, combinations, sub-combinations and substitutions can be made according to design requirements and other factors. Any modifications, equivalent replacements, improvements and the like made within the spirit and principle of the disclosure shall fall within the scope of protection of the disclosure.

What is claimed is:

1. A method for detecting an obstacle, comprising:

acquiring point cloud data collected by a lidar sensor during detection of an obstacle;

converting the point cloud data into an obstacle feature map, wherein the obstacle feature map comprises a to-be-detected image feature, and the to-be-detected image feature comprises an obstacle feature, wherein the to-be-detected image feature is obtained by dividing the point cloud data according to pixels and obtaining the obstacle feature through post-processing manners including clustering;

determining point cloud distribution data according to obstacle distribution information in the point cloud data;

determining whether there is a corresponding obstacle in the point cloud data in a case that the point cloud data is not a null value;

generating monitoring data based on a Gaussian distribution function and the point cloud distribution data when there is the corresponding obstacle in the point cloud data;

performing feature extraction on the to-be-detected image feature in the obstacle feature map to obtain the obstacle feature, wherein a weight value in the obstacle feature map of the obstacle feature is increased during the feature extraction, and the feature extraction is monitored based on the monitoring data generated by point cloud distribution data corresponding to the point cloud data; and determining a target obstacle according to the obstacle feature.

2. The method as claimed in claim 1, wherein the performing feature extraction on the to-be-detected image feature in the obstacle feature map to obtain the obstacle feature comprises:

dividing a process of performing the feature extraction on the to-be-detected image feature into an encoding processing stage and a decoding processing stage;

performing primary extraction on the to-be-detected image feature based on an attention mechanism at the encoding processing stage to obtain an intermediate image feature; and performing secondary extraction on the intermediate image feature under monitoring according to the monitoring data at the decoding processing stage, to obtain the obstacle feature.

3. The method as claimed in claim 2, wherein the performing primary extraction on the to-be-detected image feature based on an attention mechanism at the encoding processing stage to obtain an intermediate image feature comprises:

determining a sampling structure of different resolutions based on a size of predetermined obstacle, wherein the sampling structure is a regular triangle structure; and performing downsampling on the to-be-detected image feature based on the sampling structure at the encoding processing stage, and extracting the intermediate image feature from the to-be-detected image feature.

4. The method as claimed in claim 2, wherein the performing secondary extraction on the intermediate image feature under monitoring according to the monitoring data at the decoding processing stage, to obtain the obstacle feature comprises:

using the monitoring data to add the point cloud distribution data to the obstacle feature map based on a supervised learning method at the decoding processing stage, and performing upsampling on the obstacle feature map of different resolutions to obtain a processed obstacle feature map; and performing secondary extraction on the intermediate image feature in the processed obstacle feature map, to obtain the obstacle feature.

5. The method as claimed in claim 1, wherein the determining a target obstacle according to the obstacle feature comprises:

using the obstacle feature as input data of an obstacle detection model, and receiving an output result of the obstacle detection model; and determining whether an object corresponding to the obstacle feature is the target obstacle based on the output result.

6. The method as claimed in claim 1, wherein before the converting the point cloud data into an obstacle feature map, the method further comprises:

dividing the point cloud data into a plurality of lattices according to distance information; and determining a point cloud range of the point cloud data according to distribution positions of the point cloud data in the lattices.

7. The method as claimed in claim 1, wherein the converting the point cloud data into an obstacle feature map comprises:

dividing the point cloud data according to pixels to obtain divided point cloud data; and performing post-processing manners on the divided point cloud data to obtain a plurality of obstacle features.

8. The method as claimed in claim 1, wherein when a distance between two or more obstacle points is less than a preset value, a maximum monitoring data in the two or more obstacle points is selected as the monitoring data of an area where two or more obstacle points are located.

9. The method as claimed in claim 1, wherein when two or more obstacle points intersect with each other, a maximum monitoring data in the two or more obstacle points is selected as the monitoring data of an area where two or more obstacle points are located.

10. An electronic device, comprising:

at least one processor, and a memory, communicatively connected to the at least one processor, wherein the memory stores an instruction executable by the at least one processor, and the instruction is performed by the at least one processor, to cause the at least one processor to perform an obstacle detection method:

acquiring point cloud data collected by a lidar sensor during detection of an obstacle;

converting the point cloud data into an obstacle feature map, wherein the obstacle feature map comprises a to-be-detected image feature, and the to-be-detected image feature comprises an obstacle feature, wherein the to-be-detected image feature is obtained by dividing the point cloud data according to pixels and obtaining the obstacle feature through post-processing manners including clustering;

determining point cloud distribution data according to obstacle distribution information in the point cloud data;

determining whether there is a corresponding obstacle in the point cloud data in a case that the point cloud data is not a null value;

generating monitoring data based on a Gaussian distribution function and the point cloud distribution data when there is the corresponding obstacle in the point cloud data;

performing feature extraction on the to-be-detected image feature in the obstacle feature map to obtain the obstacle feature, wherein a weight value in the obstacle feature map of the obstacle feature is increased during the feature extraction, and the feature extraction is monitored based on the monitoring data generated by point cloud distribution data corresponding to the point cloud data; and determining a target obstacle according to the obstacle feature.

11. The electronic device as claimed in claim 10, wherein the instruction is performed to cause the at least one processor to perform the obstacle detection method:

dividing a process of performing the feature extraction on the to-be-detected image feature into an encoding processing stage and a decoding processing stage;

performing primary extraction on the to-be-detected image feature based on an attention mechanism at the encoding processing stage to obtain an intermediate image feature; and performing secondary extraction on the intermediate image feature under monitoring according to the monitoring data at the decoding processing stage, to obtain the obstacle feature.

12. The electronic device as claimed in claim 11, wherein the instruction is performed to cause the at least one processor to perform the obstacle detection method:

determining a sampling structure of different resolutions based on a size of predetermined obstacle, wherein the sampling structure is a regular triangle structure; and performing downsampling on the to-be-detected image feature based on the sampling structure at the encoding processing stage, and extracting the intermediate image feature from the to-be-detected image feature.

13. The electronic device as claimed in claim 11, wherein the instruction is performed to cause the at least one processor to perform the obstacle detection method:

using the monitoring data to add the point cloud distribution data to the obstacle feature map based on a supervised learning method at the decoding processing stage, and performing upsampling on the obstacle feature map of different resolutions to obtain a processed obstacle feature map; and performing secondary extraction on the intermediate image feature in the processed obstacle feature map, to obtain the obstacle feature.

14. The electronic device as claimed in claim 10, wherein the instruction is performed to cause the at least one processor to perform the obstacle detection method:

using the obstacle feature as input data of an obstacle detection model, and receiving an output result of the obstacle detection model; and determining whether an object corresponding to the obstacle feature is the target obstacle based on the output result.

15. The electronic device as claimed in claim 10, wherein the instruction is performed to cause the at least one processor to perform the obstacle detection method:

dividing the point cloud data into a plurality of lattices according to distance information; and determining a point cloud range of the point cloud data according to distribution positions of the point cloud data in the lattices.

16. The electronic device as claimed in claim 10, wherein the instruction is performed to cause the at least one processor to perform the obstacle detection method:

dividing the point cloud data according to pixels to obtain divided point cloud data; and performing post-processing manners on the divided point cloud data to obtain a plurality of obstacle features.

17. A non-transitory computer readable storage medium, storing a computer instruction, wherein the computer instruction is used for a computer to perform an obstacle detection method:

acquiring point cloud data collected by a lidar sensor during detection of an obstacle;

converting the point cloud data into an obstacle feature map, wherein the obstacle feature map comprises a to-be-detected image feature, and the to-be-detected image feature comprises an obstacle feature, wherein the to-be-detected image feature is obtained by dividing the point cloud data according to pixels and obtaining the obstacle feature through post-processing manners including clustering;

determining point cloud distribution data according to obstacle distribution information in the point cloud data;

determining whether there is a corresponding obstacle in the point cloud data in a case that the point cloud data is not a null value;

generating monitoring data based on a Gaussian distribution function and the point cloud distribution data when there is the corresponding obstacle in the point cloud data;

performing feature extraction on the to-be-detected image feature in the obstacle feature map to obtain the obstacle feature, wherein a weight value in the obstacle feature map of the obstacle feature is increased during the feature extraction, and the feature extraction is monitored based on the monitoring data generated by point cloud distribution data corresponding to the point cloud data; and determining a target obstacle according to the obstacle feature.

18. The non-transitory computer readable storage medium as claimed in claim 17, wherein the computer instruction is used for the computer to perform the obstacle detection method:

dividing a process of performing the feature extraction on the to-be-detected image feature into an encoding processing stage and a decoding processing stage;

performing primary extraction on the to-be-detected image feature based on an attention mechanism at the encoding processing stage to obtain an intermediate image feature; and performing secondary extraction on the intermediate image feature under monitoring according to the monitoring data at the decoding processing stage, to obtain the obstacle feature.

* * * * *